United States Patent
Haines

(10) Patent No.: US 7,478,654 B2
(45) Date of Patent: Jan. 20, 2009

(54) HOSE

(75) Inventor: Bradley James Haines, Sun Prairie, WI (US)

(73) Assignee: Veyance Technologies, Inc., Akron, OH (US)

( * ) Notice: Subject to any disclaimer, the term of this patent is extended or adjusted under 35 U.S.C. 154(b) by 4 days.

(21) Appl. No.: 11/505,965

(22) Filed: Aug. 17, 2006

(65) Prior Publication Data

US 2008/0041484 A1  Feb. 21, 2008

(51) Int. Cl.
 *F16L 11/08* (2006.01)
 *F16L 11/04* (2006.01)

(52) U.S. Cl. .................. 138/137; 138/140; 138/141; 138/125; 138/DIG. 7

(58) Field of Classification Search ........... 138/126, 138/137, 125, 140, 141, DIG. 7; 428/474.7, 428/474.9
 See application file for complete search history.

(56) References Cited

U.S. PATENT DOCUMENTS

| | | | | |
|---|---|---|---|---|
| 4,862,923 A * | 9/1989 | Kitami et al. | | 138/125 |
| 5,016,675 A * | 5/1991 | Igarashi et al. | | 138/125 |
| 5,866,265 A | 2/1999 | Reilly et al. | | 428/492 |
| 5,937,911 A * | 8/1999 | Kodama et al. | | 138/137 |
| 6,345,647 B2 * | 2/2002 | Niki et al. | | 138/126 |
| 6,536,479 B2 | 3/2003 | Wilson et al. | | 138/137 |
| 6,770,340 B2 | 8/2004 | Zumbrunnen et al. | | 428/35.7 |
| 6,792,978 B2 | 9/2004 | Ainsworth | | 138/137 |
| 6,902,805 B2 | 6/2005 | Zumbrunnen et al. | | 428/375 |
| 6,936,203 B2 | 8/2005 | Reilly et al. | | 264/176.1 |
| 7,002,754 B2 | 2/2006 | Baer et al. | | 359/653 |
| 2002/0185188 A1 * | 12/2002 | Quigley et al. | | 138/137 |
| 2003/0121560 A1 * | 7/2003 | Morohoshi et al. | | 138/137 |
| 2004/0175656 A1 | 9/2004 | Baer et al. | | 430/290 |
| 2004/0219364 A1 | 11/2004 | Shirk et al. | | 428/411.1 |
| 2005/0008807 A1 | 1/2005 | Wilson et al. | | 428/36.91 |
| 2005/0011571 A1 | 1/2005 | Wilson et al. | | 138/126 |
| 2005/0113503 A1 | 5/2005 | Zumbrunnen | | 524/445 |
| 2005/0265119 A1 | 12/2005 | Zumbrunnen | | 366/97 |

FOREIGN PATENT DOCUMENTS

EP  1393889 A1  3/2004
WO  03004538 A1  1/2003

OTHER PUBLICATIONS

European Patent Office, Search Report issued in corresponding European Patent Application serial No. 07114543.7-2124 dated Jan. 7, 2008.

* cited by examiner

*Primary Examiner*—Patrick F Brinson
(74) *Attorney, Agent, or Firm*—Wood, Herron & Evans L.L.P.

(57) ABSTRACT

A hose including at least one permeation resistant layer, an elastomeric layer overlaying each at least one permeation resisting layer, at least one reinforcement layer overlaying an elastomeric layer, and a cover layer overlaying the at least one reinforcement layer, wherein the at least one permeation resistant layer includes a plurality of sublayers of at least two different thermoplastics wherein the sublayers have a thickness of less than 2500 nanometers.

9 Claims, 1 Drawing Sheet

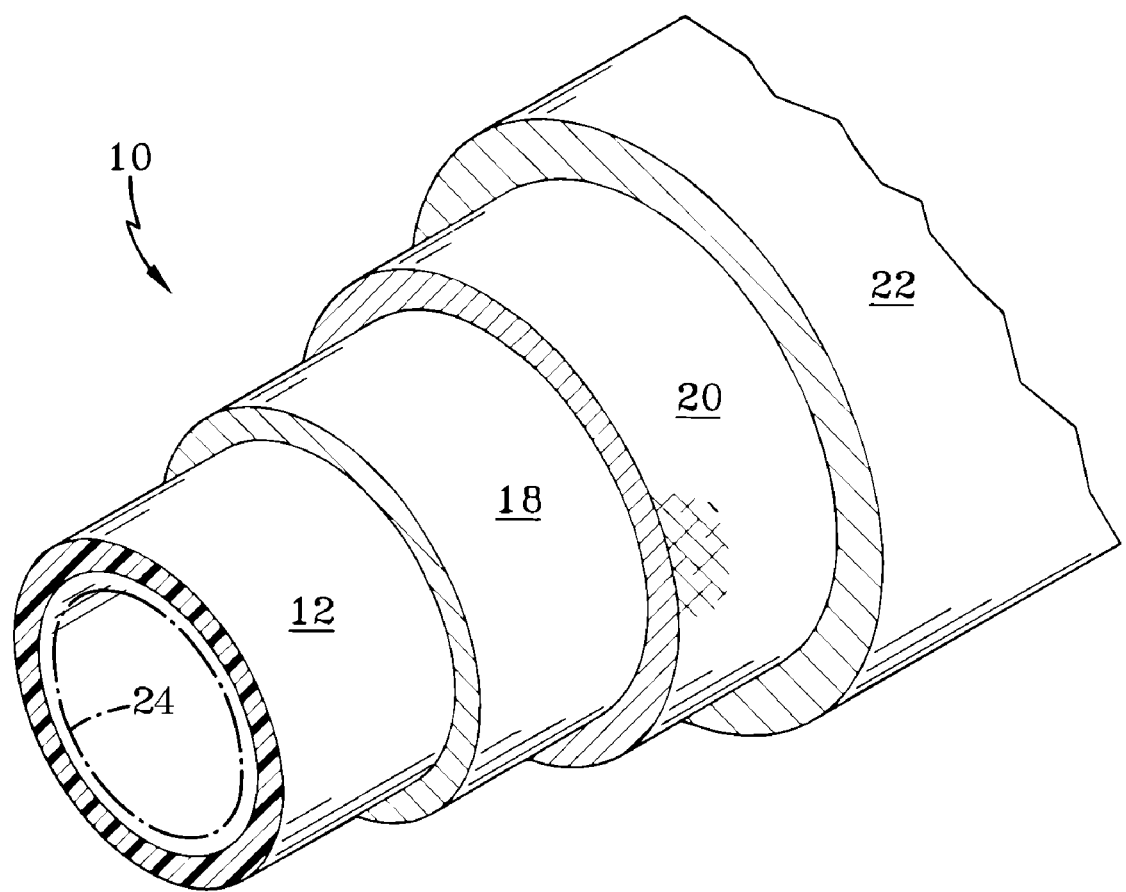

HOSE

BACKGROUND OF THE INVENTION

The automotive industry uses hoses for transporting refrigerants. The hoses generally have a multi-layer laminar construction consisting of an innermost layer, an outermost cover layer located radially outwardly of the inner tube, and a reinforcing fiber layer interposed between the innermost layer and the outermost layer. Generally, the inner and outer layers are formed of rubber. The reinforcing fiber layer usually is a mesh structure formed by braided organic yarn such as polyester fiber, rayon fiber, or nylon fiber. Adhesion layers may be between the layers.

The known multi-layered rubber hoses discussed above have a high degree of flexibility. Because of this property of the rubber materials, rubber hoses can be handled with ease. However, rubber materials generally tend to have high gas permeability. Attempt to improve resistance of conventional rubber hoses to refrigerant permeation by incorporating polyamide layers such as nylon 6 or nylon 66 as a permeation resistant layer.

SUMMARY OF THE INVENTION

The present invention is directed to a hose comprising at least one permeation resistant layer, an elastomeric layer overlaying each at least one permeation resisting layer, at least one reinforcement layer overlaying an elastomeric layer, and a cover layer overlaying the at least one reinforcement layer, wherein the at least one permeation resistant layer is comprised of a plurality of sublayers of at least two different thermoplastics wherein the sublayers have a thickness of less than 2500 nanometers.

BRIEF DESCRIPTION OF THE DRAWINGS

The invention will be described by way of example and with reference to the accompanying drawings in which:

The drawing shows a perspective view of a hose in accordance with the present invention.

DETAILED DESCRIPTION OF THE INVENTION

One embodiment of a hose according to the present invention is illustrated in the drawing as hose 10. The hose 10 has a permeation resistant layer 12, relative to the radial direction of the hose and the longitudinal hose axis. In this embodiment, the permeation resistant layer 12 is formed from at least two thermoplastics. Over the permeation resistant layer 12 is an elastomeric friction layer 18, over which is a reinforcing layer 20, and overall, a cover layer 22.

The permeation resistant layer is formed from at least two different thermoplastics. The at least two different thermoplastics are processed in such a way as to form a composite of the two thermoplastics having a plurality of layers. When the composite is used as the permeation resistant layer, the plurality of layers in the composite is referred herein as a plurality of sublayers. In one embodiment, the sublayers each have a thickness less than 2500 nanometers. In another embodiment, the sublayers each have a thickness less than 1000 nanometers. In another embodiment, the sublayers each have a thickness less than 500 nanometers. In another embodiment, the sublayers each have a thickness less than 250 nanometers. The thickness of the sublayers depends at least in part on the process method used to form the composite of the at least two thermoplastics.

One process method to form the composite of the at least two thermoplastics used in the permeation resistant layer is as disclosed in U.S. Pat. Nos. 6,770,340 and 6,902,805; and U.S. Publications 2005/0113503 and 2005/0265119; all of which are fully incorporated by reference herein. As disclosed therein, there is described a method for the production of a multiple phase composite material, wherein the composite material includes a major phase component and at least one minor phase component. The major and minor phase components are arranged in a desired predefined morphological structure in which the major phase component and the minor phase components have predefined size and shape characteristics. The method involves supplying the major phase component to a chaotic mixer in a controlled manner and supplying the minor phase components to the chaotic mixer in a controlled manner. Within the chaotic mixer the major phase component and minor phase components undergo mixing according to controlled parameters to controllably and progressively develop predefined desired morphologies. Multilayered film microstructures can be formed utilizing chaotic mixing in accordance with the method. For example, the layers of the multilayered film can be less than about 200 nanometers, particularly less than about 100 nanometers, and more particularly less than about 50 nanometers. Distributed multilayered films can be formed to have a greater number of layers than conventional processes. For instance, multilayered films can be formed to have greater than about 10 layers and more particularly greater than about 100 layers. In some instances, the multilayered films can also be formed to have greater than about 1,000 layers, in some cases greater than about 4,000 layers, in some cases greater than about 5,000 layers, and in some cases, greater than about 10,000 layers without breaking apart. For example, a relatively stable multilayered film can contain between about 4,500 layers to about 12,000 layers.

Another process method to form the composite of the at least two thermoplastics used in the permeation resistant layer is as disclosed in U.S. Pat. Nos. 5,866,265 and 6,936,203, each of which are fully incorporated herein by reference. As disclosed therein, a multilayer composite of at least two materials may be formed by use of multiple extruders. For example, an array of dies having a closed configuration may be used in a method and apparatus for making a closed composite article that comprises multilayered materials. In the method and apparatus, at least two extruders are used to extrude at least two material streams through the die array to provide an extrudate comprised of alternate layers of material from the at least two material streams. The compositions in the two material streams can be the same or different. Using such a method, multilayer composites can be obtained having as many as 200 to 20,000 layers per 25.4 millimeters.

Suitable thermoplastic materials for use in the permeation resistant layer include polyolefin thermoplastic resins, such as high density polyethylene (HDPE), ultrahigh molecular weight polyethylene (UHMWPE), polypropylene (PP), and ethylene propylene copolymer thermoplastic resin; polyamide thermoplastic resins such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer; polyester thermoplastic resins such as polybutylene terephthalate (PBT), polyethylene terephthalate (PET), polyethylene isophthalate (PEI), PET/PEI copolymer, polyacrylate (PAR), polybutylenenaphthalate (PBN), polyoxyalkylenediimidate/polybutyrateterephthalate copolymer, and other aromatic polyesters; polynitrile thermoplastic resins such as polyacrylonitrile (PAN), polymethacrylonitrile, acrylonitrile/styrene copolymer (AS), methacrylonitrile/styrene copolymer, methacrylonitrile/styrene/butadiene copolymer; polymethacrylate thermoplastic resins such as polymethyl methacrylate (PMMA), and polyethylmethacrylate; vinyl resins such as vinyl acetate (EVA), polyvinylalcohol (PVA), vinylalcohol/ethylene copolymer (EVOH), polyvinylidene chloride (PVDC), polyvinyl chloride (PVC), vinyl chloride/vinylidene chloride copolymer, and vinylidene chloride/methylacrylate copolymer; cellulose thermoplastic resins such as cellulose acetate, cellulose acetate butyrate; fluororesins such as polyvinylidene fluoride (PVDF), polyvinyl fluoride (PVF), polychlorofluoroethylene (PCTFE), and tetrachloroethylene/ethylene copolymer (ETFE); and imide thermoplastic resins such as aromatic polyimide (PI).

In one embodiment, a liquid crystal polymer may be used with a second thermoplastic. Examples of suitable liquid crystal polymers include the following aromatic polyesters: XYDAR (made by Dartco), VECTRA (made by Hoeschst-Celanese), or EKONOL (made by Sumitomo Chemicals). The liquid crystal polymer may be used with a second thermoplastic selected from polyolefin thermoplastic resins, such as high density polyethylene (HDPE), ultrahigh molecular weight polyethylene (UHMWPE), polypropylene (PP), and ethylene propylene copolymer thermoplastic resin; polyamide thermoplastic resins such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer; polyester thermoplastic resins such as polybutylene terephthalate (PBT), polyethylene terephthalate (PET), polyethylene isophthalate (PEI), PET/PEI copolymer, polyacrylate (PAR), polybutylenenaphthalate (PBN), polyoxyalkylenediimidate/polybutyrateterephthalate copolymer, and other aromatic polyesters; polynitrile thermoplastic resins such as polyacrylonitrile (PAN), polymethacrylonitrile, acrylonitrile/styrene copolymer (AS), methacrylonitrile/styrene copolymer, methacrylonitrile/styrene/butadiene copolymer; polymethacrylate thermoplastic resins such as polymethyl methacrylate (PMMA), and polyethylmethacrylate; vinyl resins such as vinyl acetate (EVA), polyvinylalcohol (PVA), vinylalcohol/ethylene copolymer (EVOH), polyvinylidene chloride (PVDC), polyvinyl chloride (PVC), vinyl chloride/vinylidene chloride copolymer, and vinylidene chloride/methylacrylate copolymer; cellulose thermoplastic resins such as cellulose acetate, cellulose acetate butyrate; fluororesins such as polyvinylidene fluoride (PVDF), polyvinyl fluoride (PVF), polychlorofluoroethylene (PCTFE), and tetrachloroethylene/ethylene copolymer (ETFE); and imide thermoplastic resins such as aromatic polyimide (PI).

In another embodiment, an ethylene vinyl alcohol copolymer may be used with a second thermoplastic. The ethylene vinyl alcohol copolymer may be used with a second thermoplastic selected from polyolefin thermoplastic resins, such as high density polyethylene (HDPE), ultrahigh molecular weight polyethylene (UHMWPE), polypropylene (PP), and ethylene propylene copolymer thermoplastic resin; polyamide thermoplastic resins such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer; polyester thermoplastic resins such as polybutylene terephthalate (PBT), polyethylene terephthalate (PET), polyethylene isophthalate (PEI), PET/PEI copolymer, polyacrylate (PAR), polybutylenenaphthalate (PBN), polyoxyalkylenediimidate/polybutyrateterephthalate copolymer, and other aromatic polyesters; polynitrile thermoplastic resins such as polyacrylonitrile (PAN), polymethacrylonitrile, acrylonitrile/styrene copolymer (AS), methacrylonitrile/styrene copolymer, methacrylonitrile/styrene/butadiene copolymer; polymethacrylate thermoplastic resins such as polymethyl methacrylate (PMMA), and polyethylmethacrylate; vinyl resins such as vinyl acetate (EVA), polyvinylalcohol (PVA), vinylalcohol/ethylene copolymer (EVOH), polyvinylidene chloride (PVDC), polyvinyl chloride (PVC), vinyl chloride/vinylidene chloride copolymer, and vinylidene chloride/methylacrylate copolymer; cellulose thermoplastic resins such as cellulose acetate, cellulose acetate butyrate; fluororesins such as polyvinylidene fluoride (PVDF), polyvinyl fluoride (PVF), polychlorofluoroethylene (PCTFE), and tetrachloroethylene/ethylene copolymer (ETFE); and imide thermoplastic resins such as aromatic polyimide (PI).

The relative amounts of the at least two thermoplastics in the permeation resistant layer may vary. In one embodiment, the weight ratio of a first thermoplastic to a second thermoplastic may range from 5:1 to 1:5. In another embodiment, the weight ratio of a first thermoplastic to a second thermoplastic may range from 2:1 to 1:2.

Particulate materials may be added to the thermoplastics to impart an enhanced permeation resistance in the permeation resistant layer. In one embodiment, the particulate material may be clay, mica, and the like. The clay may be intercalated and/or exfoliated using methods as are known in the art. The particulate material may be added to the thermoplastic prior to formation of the plurality of sublayers, or the particulate may be added during the formation of the plurality of sublayers.

Again referring to the drawing, layer 18 is an elastomeric friction layer between the permeation resistant layer 12 and the reinforcing layer 20 and provides flexibility to the hose 10. The elastomer selected for this layer should meet those characteristics. For adhesion to the permeation resistant layer 12, the elastomeric layer 18 may be extruded onto the permeation resistant layer 12. The layer may also be applied in the form of a sheet either spirally wrapped or butt seamed. These methods of applying such layers are known in the art, and variations thereof are contemplated herein.

The elastomeric friction layer 18 comprises a base polymer selected from polyisoprene, polybutadiene, copolymers of butadiene and acrylonitrile, copolymers of butadiene and styrene, polychloroprene, polybutadiene, ethylene propylene copolymers, EPDMs such as ethylene propylene norbornene terpolymers, ethylene propylene-1,4-hexadiene terpolymers, ethylene propylene dicyclopentadiene terpolymers and the like. In one embodiment, the base stock for the friction layer is EPDM.

The base polymer in the friction layer 18 may have an adhesive system and a peroxide or sulfur curative. Useful adhesive systems include conventionally known resorcinol, phenolic, or maleinized polybutadiene based adhesive systems. The resorcinol component may be added to the elastomer in the nonproductive mix, or preformed adhesive resins may be added during the productive mix. The amount of adhesive system utilized in the elastomeric friction layer can range from 1 to 10 parts by weight based on 100 parts of base stock polymer. The peroxide or sulfur curatives useful in the friction layer 18 are those that are normally used in such base stocks. The peroxide or sulfur curatives useful in the elastomeric friction layer are those that are normally used in such base stocks. For example, peroxides such as dicumyl peroxide, [α,α'-bis(t-butylperoxide)diisopropylbenzene], benzoyl peroxide, 2,4-dichlorobenzoyl peroxide, 1,1-bis(t-butylperoxy)3,3,5-trimethylcyclohexane, 2,5-dimethyl-2,5-bis(t-butylperoxy)hexane, 2,5-dimethyl-2,5-bis(t-butylperoxy)hexyne-3, and n-butyl 4,4-bis(t-butylperoxy)valerate. From 1 to about 10 parts of peroxide or sulfur are utilized based on 100 parts of base polymer.

The reinforcing layer 20 may be a fiber layer as commonly used as a reinforcing layer for hoses. The layer 20 may be formed by braiding, spiraling, knitting, or helical knitting of yarn. The yarn may be selected from conventional hose reinforcing yarns such as glass, steel, cotton, polyester, or aramid fibers, or a blend of any of these fibers.

The cover layer 22 is selected from known cover layer materials, including but not limited to nitrile-butadiene rubber (NBR), chlorosulfonated polyethylene rubber (CSM), ethylene-propylene-diene rubber (EPDM), butyl rubber (IIR), chlorinated butyl rubber (Cl-IIR), brominated butyl rubber (Br-IIR), epichlorohydrine rubber (CHR, CHC), acrylic rubber (ACM), chloroprene rubber (CR), ethylene-acrylic elastomer (AEM) and the like. In one embodiment, the base stock for the cover layer is AEM.

The Embodiment of a hose as shown in the drawing is known in the art as a veneer hose, wherein a permeation resistant layer is the innermost layer of the hose. In another embodiment, the hose may include an elastomeric layer 24 as the innermost layer, with a permeation resistant layer overlaying the innermost layer. Such a hose is known in the art as a barrier hose. In another embodiment, those hose may have two or more permeation resistant layers. In these embodiments, the hose may include a permeation resistant layer as the innermost layer with one or more additional permeation resistant layers interspersed with elastomeric layers. In another embodiment, the hose may include an elastomeric layer as the innermost layer, with two or more permeation resistant layers interspersed with elastomeric layers.

While the embodiment as illustrated in the drawing is for a refrigerant hose, the present invention is not so limited. Depending upon the materials selected, a hose according to the present invention may also be suitable as an automotive fuel hose to convey hydrocarbon fuels, or a fuel cell hose to convey oxygen, hydrogen, carbon dioxide and the like.

Variations in the present invention are possible in light of the description of it provided herein.

While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A hose comprising:
    at least one permeation resistant layer configured to resist the permeation of a refrigerant;
    an elastomeric layer overlaying the at least one permeation resisting layer;
    at least one reinforcement layer overlaying the elastomeric layer; and
    a cover layer overlaying the at least one reinforcement layer,
    wherein the at least one permeation resistant layer is comprised of a plurality of sublayers of first and second thermoplastics in a weight ratio ranging from 5:1 to 1:5, the first thermoplastic is a liquid crystal polymer, and each of the sublayers has a thickness of less than 2500 nanometers.

2. The hose of claim 1 wherein the thickness is less than 1000 nanometers.

3. The hose of claim 1 wherein the thickness is less than 500 nanometers.

4. The hose of claim 1 wherein the thickness is less than 250 nanometers.

5. The hose of claim 1 wherein the second thermoplastic is selected from the group consisting of high density polyethylene (HDPE), ultrahigh molecular weight polyethylene (UHMWPE), polypropylene (PP), and ethylene propylene copolymer thermoplastic resin; nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer; polybutylene terephthalate (PBT), polyethylene terephthalate (PET), polyethylene isophthalate (PU), PET/PET copolymer, polyacrylate (PAR), polybutylenenaphthalate (PB N), polyoxyalkylenediimidate/polybutyrateterephthalate copolymer, and other aromatic polyesters; polyacrylonitrile (PAN), polymethacrylonitrile, acrylonitrile/styrene copolymer (AS), methacrylonitrile/styrene copolymer, methacrylonitrile/styrene/butadiene copolymer; polymethacrylate thermoplastic resins such as polymethyl methacrylate (PMMA), and polyethylmethacrylate; vinly acetate (EVA), polyvinylalcohol (PVA), vinylalcohol/ethylene copolymer (EVOH), polyvinylidene chloride (PVDC), polyvinyl chloride (PVC), vinyl chloride/vinylidene chloride copolymer, and vinylidene chloride/methylacrylate copolymer; cellulose acetate, cellulose acetate butyrate; polyvinylidene fluoride (PVDF), polyvinyl fluoride (PVF), polychlorofluoroethylene (PCTFE), and tetrachloroethylene/ethylene copolymer (ETFE), tetrafluoroethylene-hexafluoropropylene/vinylidene fluoride terpolymer (THV); and aromatic polyimide (PI).

6. The hose of claim 1 wherein one of the sublayers is an innermost layer of the hose.

7. The hose of claim 1 further comprising:
    another elastomeric layer radially inside of the at least one permeation resistant layer.

8. The hose of claim 1 wherein the weight ratio ranges from 2:1 to 1:2.

9. The hose of claim 1 wherein:
    the permeation resistant layer further contains a particulate selected from the group consisting of clay and mica.

* * * * *